United States Patent Office 3,004,853
Patented Oct. 17, 1961

3,004,853
SHORTENING COMPOSITION AND EMULSIFIER SYSTEM THEREFOR
Percy L. Julian, Oak Park, Herbert T. Iveson, Elmhurst, and Sol B. Radlove, Ralph Siutkin, and Paul F. Davis, Chicago, Ill., assignors to The Glidden Company, Cleveland, Ohio, a corporation of Ohio
No Drawing. Filed May 13, 1958, Ser. No. 735,070
19 Claims. (Cl. 99—123)

This invention relates to novel glyceride oil compositions having shortening properties and to a novel emulsifier system especially adapted for use therein.

The invention also relates to similar emulsifier systems for use generally in connection with liquid oil composition having all purpose shortening properties as well as with plastic or other non-liquid shortenings. The emulsifier systems consist essentially of a combination of two separate emulsifiers; namely, an acidic ester of a hydroxypolycarboxylic acid component, such as a cetyl citrate, and an edible partial-to-full ester component having restricted amounts of water-soluble edible hydroxy monocarboxylic acid(s) combined with the polyol along with restricted amounts of glyceride oil fatty acids. As will be explained hereinafter the polyol ester component, in order to be fully soluble in a liquid glyceride oil, must have the hydroxy acid(s) and fatty acids carefully proportioned with glycerine as the sole polyol.

Shortenings have heretofore been composed essentially of solid fats or of mixtures of solid and liquid fats, and have been processed by techniques which make the resulting product plastic and workable at room temperatures. Such plastic shortenings have usually contained small amounts of emulsifiers and other modifiers whose functions are to improve the performance of the shortening in specific end uses. Although the plastic shortenings have enjoyed wide application to industrial and household baking and related uses, they are subject to several disadvantages. In both industry and household applications, plastic shortenings are difficult to apportion accurately, and being neither solid nor fluid are messy and inconvenient to transfer. In fact, in some baking establishments, equipment is provided to liquefy and mete out and transfer the plastic shortening. For more convenient use and therefore greater acceptability, a shortening composition liquid at ambient temperatures would overcome these obvious shortcomings of the plastic products.

Liquid shortenings composed of liquid vegetable and/or animal oils have been proposed, but have never, to the best of our knowledge, been satisfactory as a replacement for all-purpose plastic shortenings, because it has not heretofore been possible to include therein the various emulsifiers and modifiers which are needed for baking cakes, breads, etc., for pan and deep frying, for the preparation of such emulsified products as mayonnaise, French dressing and the like. While certain emulsifiers and modifiers could be dissolved in liquid oils to render the resulting products suitable for cake baking, such were found to be unsatisfactory in one or more respects, e.g., they were incapable of withstanding the temperatures attained in deep frying, did not possess sufficient shelf stability and did not remain homogeneous at low temperatures. In order, therefore, to provide an all-purpose liquid shortening, we found it necessary to develop the wholly novel compositions and emulsifier systems described hereinafter.

Accordingly, it is an object of this invention to provide a novel all-purpose liquid shortening.

An object ancillary to the foregoing object is to provide novel emulsifier systems suitable for use in an all-purpose liquid shortening.

A further object is to provide a novel combination of emulsifiers having general utility in the edible arts, especially in edible shortenings.

These and other objects will be apparent from the following descriptions of our invention.

As indicated above, an all-purpose liquid shortening should be capable of performing satisfactorily in most, if not all, of the following respects:

(1) In baking operations, as in baking cakes, breads, biscuits, muffins, pancakes, waffles, cookies, etc.
(2) In the preparation of icings, fillers, candies, etc.
(3) In pan frying operations, braising, etc.
(4) In deep frying operations, as practiced in frying French-fried potatoes, doughnuts, onion rings, potato chips, etc.
(5) In emulsion preparation, as in the preparation of boiled sauces, salad dressings, etc.

The foregoing uses of an all-purpose liquid shortening which is capable also of use as a high-quality salad oil prescribe certain attributes and qualities in the emulsifiers which are to be included in such a liquid shortening, and similar and other attributes and qualities are prescribed by the broad aim of providing a product which can be marketed widely in a variety of geographical areas, in all seasons of the year. Some of these attributes and qualities are:

(A) The chemical, physical and/or physico-chemical properties which lead to satisfactory baking performance;
(B) A high smoke point;
(C) Chemical stability over a period of at least six months;
(D) Non-toxicity; and
(E) Bland flavor.

There is little of interest in a detailed review of the shortcomings of the liquid shortenings which heretofore have been available. Suffice it to say that our tests of such so-called "liquid shortenings" have demonstrated these products to be inadequately emulsified and that such emulsifiers as have been used are unsatisfactory in at least one respect.

According to the present invention, a liquid glyceride oil composition has been developed meeting the requirements set out above. We have found that an emulsion system consisting of from 3 to 5% by weight of a glyceride ester derivable from one mol of glycerine, one mol of fatty acid having 12 to 22 carbon atoms and 1.75 to 3 mols of lactic acid, together with about 0.2%–3% of dicetyl citrate, will act to impart all-purpose shortening properties to edible liquid glyceride oils.

Illustrative of such lacto-glyceride fatty acid esters are those disclosed and claimed in co-pending application Serial No. 447,938 of Radlove et al., filed August 20, 1954. The cetyl citrate used in our novel compositions can be prepared by heating 1 molar equivalent of citric acid with 2.25 molar equivalents of cetyl alcohol at above the melting point of the mixture. The mixture is agitated until a clear fluid mass is obtained and until the acid number is below 100. The resulting mixture is cooled in vacuo. A typical analysis of cetyl citrate prepared in this manner follows:

| | |
|---|---|
| Monocetyl citrate | percent 0.4 |
| Dicetyl citrate | do 55.0 |
| Tricetyl citrate | do 44.6 |
| Acid number | 61 |

We have found such a mixture of esters to be satisfactory as the dicetyl citrate component of our novel composition with respect to oil solubility and shortening effectiveness in conjunction with the lacto-glyceride ester component. The diester is the most useful for our purpose. However, mixtures of the di- and tri-esters have greater solubility. On the other hand, the mono-ester contributes a bitter taste to the oil. This component, therefore, should be kept as low as possible.

Although as indicated above, at least about 0.25% of the dicetyl ester by weight on the liquid oil is required to impart all-purpose shortening properties, in conjunction with 3 to 5% of the lacto-glyceride ester (by weight on the liquid oil), we prefer to use above 0.8% of the dicetyl citrate, and we have obtained maximum effectiveness in our novel compositions from a mixture of 1% dicetyl citrate with 4% of a lacto-glyceride ester. Such a composition is characterized also by good solubility at shelf temperatures, i.e., about 25° C., and remains clear for at least one hour at about 5° C.

The unique mixture of emulsifiers used in our novel compositions provides liquid oil compositions having shortening properties never before obtained. It is believed that each emulsifier serves a particular purpose. For example, in cake baking the lacto-glyceride esters (as pointed out in the aforementioned co-pending application Serial No. 447,938) are of especial value in providing batters of low specific gravity which is a measure of the amount of air occluded by the batter. According to many experts in the baking art the porous structure, volume and general appearance of the finished cake are dependent upon the entrapped air. However, we found when using liquid shortening containing a lacto-glyceride ester as the sole emulsifier that the cakes had a tendency to "dip"; that is, after rising to a satisfactory height but before completion of the baking cycle, the cell structure of the cake evidently broke and a depression appeared at the center of the cake. This "dip" is not evident when dicetyl citrate is used in addition to the lacto-glyceride ester. It follows from this surprising observation that one function of the dicetyl citrate in cake batter may be to stabilize the batter emulsion during baking. The following examples illustrate the oil-soluble emulsifier facet of our invention and the best modes presently known to us for practicing the invention in respect to that facet.

EXAMPLE 1

(A) *Preparation of lacto-glyceride ester component*

A mixture composed of 167.0 g. of Neo-Fat 16 (a product of Armour & Co. having the following composition: Palmitic acid, 90%; oleic acid, 4%; stearic acid, 6%); 61.8 g. of 95% glycerine and 138 g. of 85% lactic acid (two mols) was heated during 20 minutes to 170° C., while passing a slow stream of carbon dioxide through the molten mixture. A vacuum of 4" was then applied which during the succeeding five hours was gradually increased to 28" and 29". The temperature was permitted to increase to, and was maintained at 180° C. after the first two hours of the reaction. The reacting mixture was heated under total reflux, the water being separated from the lactic acid with the latter being returned to the reaction mixture. After 7½ hours, the heating was discontinued and the reacted mixture was cooled to about 100° C. The mass was washed with 3 portions of 1 liter each of 3% aqueous sodium sulfate. Thereafter, the washed product was dried in vacuo in a steam bath. The dried product had an acid value of 18.5, an acetyl value of 118.0 and a mono-glyceride content of 5.8%. The dried product was soluble at a 4% level in cottonseed oil.

(B) *Preparation of dicetyl citrate component*

A mixture consisting of 300 grams of cetyl alcohol and 103 grams of citric acid was heated to and agitated at 160° F. for 1½ hours. The clear liquid melt was permitted to cool as vacuum was gradually applied. In this manner the product was obtained as a white solid, having an acid value of 61.

(C) *Preparation of liquid shortening composition*

To 950 grams of refined cottonseed oil, 40 grams of the lacto-palmitate glyceride ester prepared as in part A above and 10 grams of the dicetyl citrate prepared as in part B above were added. The mixture was warmed to about 60° C. and maintained at that temperature, with occasional stirring, until all of the solid had dissolved. Thereafter, the solution was permitted to cool to ambient room temperature.

The resultant liquid shortening composition was a brilliant clear solution. When held at a refrigerator temperature of about 5° C., the composition remained clear for one hour. Upon being held in the refrigerator for longer periods, a slight haze developed, which disappeared when the composition was permitted to warm up to room temperature.

EXAMPLE 2

The efficacy of the new shortening in baking of sweet goods, i.e., cakes, cookies, etc., was tested in the following standard recipes. A commercially-available plastic shortening was tested similarly for purposes of comparison. In these tests the new liquid shortening compositions were used as a replacement for the "plastic shortenings" in conventional recipes, that is to say, no changes or adjustments except as noted were made in any recipe as to quantity of ingredient or method of mixing.

(A) *"Crisco's" quick mix yellow cake*

2½ cups sifted cake flour
1⅔ cups sugar
¾ cup milk
⅔ cup shortening
1 teaspoon salt
3½ teaspoons baking powder
½ cup milk
3 eggs NOTE.—Flavoring was omitted in order that any off flavors due to the fat used could be more easily detected.

The flour, sugar, salt, ¾ cup of milk and shortening were mixed in a bowl at medium speed with an electric mixer for two minutes. The baking powder was stirred in, after which the ½ cup of milk and eggs were added. The whole mass was mixed two minutes at medium speed and the resulting batter was divided into two 9" layer cake pans. The batter was baked at 375° F. (moderate oven) for 30 to 35 minutes.

The layers prepared using liquid shortening were rated as "superior" with respect to cake volume, texture and appearance, when compared to those layers made using the indicated commercial plastic shortening.

(B) *Chiffon cakes*

Salad oils (refined vegetable oils containing no emulsifiers) have been widely promoted as "liquid shortenings." These claims have been based partly on the ability of such oils to replace the plastic shortenings in several specific recipes for cakes and pie crusts. Whereas in the recipe for the yellow cake given above, a salad oil would not be capable of replacing the emulsified shortening, a special recipe has been developed wherein no additional emulsifier (save those contained in the eggs used) is required. We have tested our novel composition against a representative salad oil ("Wesson oil") in a standard chiffon cake recipe and found that our composition gives results superior to those obtained with the salad oil.

RECIPE FOR "LOVELIGHT" CHIFFON CAKE 2 eggs, separated
1½ cups sugar
2¼ cups sifted cake flour
3 teaspoons double action baking powder
1 teaspoon salt
⅓ cup oil
1 cup milk NOTE.—Omit flavoring.

The egg whites were beaten until frothy and ½ cup of sugar beaten into the froth which then was beaten until stiff and glossy enough to stand in peaks. Into a separate bowl, the flour, 1 cup of sugar, baking powder and salt were sifted. After addition of the oil and half of the milk, the mass was mixed for one minute at a medium speed with an electric mixer, during which the sides and bottom of the bowl were scraped constantly. The rest of the milk and egg yolks were added, and the batter was beaten for one minute more. Thereafter, the meringue was folded into the batter by gently cutting down through the batter, across the bottom, up and over, turning the bowl often. The resulting batter was divided between two well-greased 8" layer cake pans, which were also dusted with flour. The batter was baked in a preheated oven at 350° F. (moderate oven) for 30 to 35 minutes.

(C) *Pie crusts*

The recipe used in this comparison with salad oil ("Wesson oil") was the "stir 'n roll" method, of General Mills.

2 cups sifted all-purpose flour
1 teaspoon salt
½ cup oil
¼ cup cold milk

The flour and salt were blended and the oil and milk were added simultaneously. The mixture was stirred lightly until mixed and the dough was "rounded up." It was then divided in half and one-half placed between two sheets of waxed paper. The dough was rolled out gently and taken out of the paper and placed in a pie plate. The dough was pricked thoroughly and then baked at 475° F. (very hot oven) for 8 to 10 minutes.

The pie crust made using our novel composition was more flaky and tender than that made from the salad oil. It was also more tender than pie crusts made using plastic shortening.

(D) The use of a liquid fat in the preparation of cookies is unusual. However, we have found that our novel composition gives excellent results when used as a replacement for salad oil or for plastic shortening, butter or margarine, in recipes designed especially for salad oil or plastic shortenings.

OIL REFRIGERATOR COOKIES 3 cups sifted all-purpose flour
1 teaspoon baking soda
1 teaspoon salt
⅔ cup oil
1 cup firmly packed brown sugar
1 cup cane sugar
2 eggs
1 teaspoon vanilla
1 cup chopped nuts The four, salt and baking soda were sifted together. In a separate bowl, the oil and sugars were mixed. The eggs were added one at a time, beating well after each addition. The vanilla and nuts were next added, followed by the dry ingredients. The mass was blended well and then shaped into two separate rolls about 2" in diameter. Each roll was wrapped in waxed paper and chilled in a refrigerator for several hours. Thereafter, the dough was cut into thin slices and baked on a lightly greased baking sheet at 400° F. (hot oven) for about 10 minutes.

The cookies made from our composition and those from the salad oil were quite similar, both being crisp and otherwise acceptable. However, the dough made with liquid shortening stayed firmer and held its shape for a longer period of time than did the salad oil-containing dough. The latter had the obvious disadvantage of softening quickly at room temperature, making it necessary to work rapidly in the slicing process to retain the roll in the desired round shape.

PLASTIC SHORTENING REFRIGERATOR COOKIES

3¾ cups sifted all-purpose flour
3 teaspoons baking powder
½ teaspoon salt
1 cup shortening
1¼ cups firmly packed brown sugar
2 eggs NOTE.—Flavoring omitted.

The shortening and sugar were blended together and then each egg was beaten into the mass. The dry ingredients were added gradually and the dough shaped into rolls about 2" in diameter. After being wrapped in waxed paper, the rolls were chilled thoroughly. The cold rolls were cut into ⅛" slices and baked on an ungreased baking sheet at 400° F. for about 8 minutes.

The baked cookies made with liquid shortening were slightly darker than those made with plastic shortening (butter or margarine). As in the above instance, the dough made with liquid shortening was easier to slice than the control dough.

(E) *Dressings and sauces*

Salad dressings of the so-called "French dressing" type were made from liquid shortening and a well-known salad oil ("Wesson oil"). The results obtained in both instances were equivalent, indicating that the presence of emulsifiers in the liquid shortening did not detract from its usefulness in this application. As would be expected, the emulsifiers present in our new composition aided in the blending of the oil-aqueous system prior to use. On standing, however, both dressings separated into layers almost equally fast. The oil layer of French dressings made with liquid shortening congealed when refrigerated and was rendered difficult to pour. Upon warming up to room temperature, however, the oil layer regained its fluidity.

Hollandaise sauce is one of the more difficult emulsion dressings to prepare. It is a cooked sauce and requires skill and experience during the heating or cooking cycle to avoid breaking of the emulsion. We have found that our liquid shortening composition prepares a more stable "Hollandaise sauce" than butter or margarine. This is illustrated by the following recipe:

HOLLANDAISE SAUCE

½ cup fat
4 egg yolks, well beaten
¾ cup of boiling water
Few grains of cayenne pepper
2 tablespoon lemon juice
¼ teaspoon salt The fat was heated in a doubleboiler, i.e., butter is melted, and the eggs were gradually stirred in, followed by the boiling water. The mixture was cooked until it began to thicken. (If sauce began to curdle, it was removed from the heat and beaten vigorously with a rotary beater until smooth and creamy.) When the smooth and creamy stage was attained, the emulsion was removed from the heat, and the pepper, salt and lemon juice were added.

When prepared with liquid shortening, the sauce, after cooking for 8 minutes over hot water, began to thin and took on the appearance of a broken emulsion. However, on being beaten, the mixture became smooth and creamy and was returned to the heat and cooked until a thick and smooth consistency was obtained. Equally good initial results were obtained when the sauce was made using butter or margarine. However, when tested for stability by holding the sauces over hot water, it was noted that the liquid shortening sauce stood for a period of in excess of 1½ hours, whereas the sauces containing plastic shortening showed signs of separation (emulsion breaking) after one hour.

(F) Deep frying

Liquid shortening was used to "deep fat" fry onions and doughnuts and compared with a commercial plastic shortening ("Crisco") and a salad oil ("Wesson oil").

No difference in flavor was detected in the onion rings or doughnuts in any instance. Further, no carry-over of flavor could be detected when the doughnuts were fried immediately after the onions or several days later. The essential difference was that after one frying test with onions at 380° F., the plastic shortening began to smoke, whereas the liquid oils did not begin to smoke until two batches of onions had been fried.

These tests indicate that the presence of the emulsifier system in our liquid shortening does not degrade the oil from the viewpoint of its utility as a "deep fat" frying medium. Its quality in this respect is primarily dependent upon the quality of the liquid glyceride oil selected as a base for the liquid shortening composition.

From the foregoing illustrative examples and descriptions, it will be understood that our invention provides a novel liquid shortening composition which is suitable for use as a replacement of both plastic shortenings and salad oils. The unique combination of edible oil-soluble emulsifying agents when incorporated in the liquid glyceride oil provides an attractive, effective and bland-tasting product which can be used either as a shortening agent or as a salad oil in the preparation of dressings and sauces. Our invention is not to be limited to the particular composition described in the illustrative examples. Although a high-grade winterized vegetable oil, and especially cottonseed oil, is preferred, any triglyceride oil which is liquid at room temperature, i.e., within the range of about 5° C. to 30° C. is contemplated by our designation of "liquid" oil. Such will include corn, cottonseed, soya, olive, peanut, linseed, safflower and such edible catalytically rearranged oils as have recently become available, as well as mixtures of these oils. Preferably, such edible oils should be "winterized" to remove the stearines and other slightly soluble components prior to use.

The lacto-glyceride ester component of our novel liquid shortening composition is preferably derived from the reaction of one mol of glycerine, 1 mol of a fatty acid mixture containing essentially palmitic acid (e.g., Neo-Fat I-56, a product of Armour & Co., which contains about 93% of palmitic acid and 2 mols of lactic acid. As referred to above, such lacto-glyceride fatty acid esters are disclosed and claimed in copending application Serial No. 447,938 of S. B. Radlove et al. Other fatty acids, such as triple pressed stearic acid, which contains about 50% palmitic acid, and others known to the art, can be used in the synthesis of this edible emulsifier. We prefer to use 4% by weight of this component, together with 1% of the dicetyl citrate component described above, dissolving these two components in winterized cottonseed oil. Such a composition is stable when stored at about 5° C. for a period of at least one hour. On longer storage, a slight haziness develops which disappears when the cold oil is permitted to stand at room temperature. The haziness does not affect the usefulness of the shortening composition, i.e., such a hazy oil can be used satisfactorily without loss of shortening character.

Antioxidants and other stabilizers such as nordehydroguiaretic acid, propyl gallate, butylated hydroxy anisole and mixtures comprising such compounds which are normally used to preserve the bland flavor of salad oils can be used in our composition also. Such will be of value especially in those instances where an inferior quality oil is used in the preparation of our novel composition and to a lesser extent where the base oil is a highly refined stable product.

While the combination of the lacto-glyceride with the dicetyl citrate represents our preferred embodiment of the principles of this invention, we have found that the dicetyl citrate can be replaced almost equally well with either of the following products, or mixtures thereof. Moreover, instead of replacing all the dicetyl citrate component, the following products can be used individually or in mixtures as partial replacement of the dicetyl citrate component. The products referred to are for convenience here identified in the following terms:

(A) An acidic stearyl lactyl tartrate.
(B) An alcoholic derivative of acetylated tartaric acid.

A more complete description of each is given under these respective topic headings.

The acidic stearyl lactyl tartrate

This product uses stearyl alcohol to esterify at least one carboxyl group of the tartaric acid and uses lactic acid to esterify at least one and preferably both hydroxyl groups of the tartaric acid. It is prepared by reacting one mole of stearyl alcohol (oleyl alcohol is not satisfactory), one mole of tartaric acid and two moles of lactic acid in the presence of moisture, the moisture being used to prevent polymerization prior to esterification. The reaction product is then heated to about 200° C. under vacuum to remove the moisture and unreacted lactic acid. We also believe this treatment causes the free carboxyl groups of the molecule to combine with hydroxyl groups thereof to reduce the acid value of the final product. The acid value remains moderately high, however, being generally around 20-35. We have found that the acid value should be 25-35 to impart cake-baking properties. This residual acidity imparts some slight taste to the all-purpose liquid shortenings in which it is used, but the taste is not objectionable. The acidic product is best used at a level of about 2% in combination with about 4% of the lactoglyceride component, both percentages being by weight on the liquid oil. The resulting emulsified oil has good all-purpose properties and is crystal-clear at room temperatures. The following example illustrates the preparation and use of the stearyl lactyl tartrate.

EXAMPLE 3

108.0 g. stearyl alcohol (0.4 mol)
60.0 g. tartaric acid (0.4 mol)
84.8 g. 85% lactic acid (0.8 mol)

These materials were reacted in a 1-liter 3-necked glass round bottom reaction flask equipped with a mechanically driven glass agitator. A thermometer was inserted for temperature readings. The reaction vessel was heated with an electric heating mantle operated through a variable transformer.

The contents were slowly heated over a period of 3.5 hours to 200° C. Water came off during this period. After one hour at 200° C. full water-aspirator vacuum was applied for one hour. Contents were cooled to 100° C. and reaction product removed. The acid value was 30.0. A dark-clear liquid was obtained which set up as a soft wax at room temperatures.

In controlled baking experiments using a conventional white cake recipe, the shortening in one set of tests consisted of 2% of the above and 4% lacto-palmitate dissolved in cotton seed oil at 60° C. The resulting solution precipitated no solids on standing overnight at room temperature (75° F.).

| | |
|---|---|
| Specific gravity of batter | 0.985. |
| Batter temperature | 74° F. |
| Batter appearance | Thin and smooth. |
| Weight of cake | 13.80 oz. |
| Displacement | 1220 cc. |
| Appearance of cake | Grain slightly coarse and irregular, nice peak, faint ring on the top of cake. |

As a control of the test, the liquid shortening as above was replaced with a commercial all-purpose plastic shortening with the following results:

| | |
|---|---|
| Sp. gr. of batter | 0.870. |
| Batter temperature | 74° F. |
| Batter appearance | Slightly curdled. |
| Weight of cake | 13.90 oz. |
| Displacement | 1,200 cc. |

*Alcohol derivative of acetylated tartaric anhydride*

U.S. Patent 2,520,139 describes the acetylation of tartaric and other hydroxy carboxylic acid anhydrides. When such acetylated tartaric anhydride products are esterified with stearyl alcohol (oleyl alcohol is unsatisfactory) or with monoglycerides of stearic or oleic acid, the resulting products are useful in the baking aspects of the present invention to supplement the lacto-glyceride component. However, these alcoholic derivatives are not completely soluble in the oil, and moreover have a very high acid value (around 100) which imparts more taste than the stearyl lactyl tartrate. The derivatives are therefore less desirable as a complete replacement for the dicetyl citrate component, but can be used where the taste and slight insolubility are not objectionable. They can be used satisfactorily for partial replacement of the dicetyl citrate component.

EXAMPLE 4

Diacetyl tartaric anhydride was prepared in a conventional manner from 75.0 grams tartaric acid and 178.7 grams acetic anhydride, with a yield of 66 grams. The method employed is described in the Journal of the Chemical Society (London) 1923, Transactions I, page 663.

Stearyl alcohol (.1 mole or 27 g.) was reacted with .1 mole (21.6 g.) of the diacetyl tartaric anhydride by heating the materials together to 110°–115° C. with agitation until a clear mass resulted. Vacuum was then applied for one-half hour to remove the odor of acetic acid. The resulting product had an acid value of 113 (theoretical value should be 115+). This product is hereinafter designated Sample 4A.

Stearic monoglyceride containing a slight amount of oleic monoglyceride was secured in the form of a commercial product (DPI 18–00), and 0.1 mole thereof was reacted with 0.1 mole of the diacetyl tartaric anhydride by heating these materials together with agitation at 115°–120° C. until a clear mass resulted. Vacuum was applied for a half hour to remove the odor of acetic acid, but even then some odor remained. The product then had an acid value of 84.1 (theoretical should have been 98+). This product is hereinafter designated Sample 4B.

Samples 4A and 4B were used in solubility tests and in baking tests. For testing the solubility in liquid oils, a lacto-palmitate emulsifier was provided by reacting as hereinabove described 2 moles of lactic acid, 1 mole of glycerine and 1 mole of palmitic acid. This lacto-palmitate had an acid value of 10.9 and was combined with Samples 4A and 4B in oil in the following proportions by weight:

2% Sample 4A, 4% lacto-palmitate, cottonseed oil, balance.

2% Sample 4B, 4% lacto-palmitate, cottonseed oil, balance.

The resulting mixtures were allowed to stand overnight at room temperature. The mixture containing Sample 4A was then a clear solution, while the mixture containing Sample 4B was clear but showed a precipitate at the bottom of the container.

In baking tests using a standard white cake recipe, but replacing the conventional all-purpose plastic shortening (employing mono- and di-glycerides as the emulsifiers at a level of about 4%) of the recipe with the above oils on an equal weight basis, the following data were secured:

SAMPLE 4A.—LACTO-PALMITATE OIL TEST

| | |
|---|---|
| Specific gravity of batter | 0.880 at 74° F. |
| Batter temperature | 74° F. |
| Batter appearance | Thin and very smooth. |
| Weight of resulting cake | 13.35 oz. |
| Cake displacement | 1,230 ml. |
| Cake appearance | Grain coarse and regular, nice peak, ring on top. |

SAMPLE 4B.—LACTO-PALMITATE OIL TEST

| | |
|---|---|
| Specific gravity of batter | .905 at 74° F. |
| Batter temperature | 74° F. |
| Batter appearance | Thin and very smooth. |
| Weight of cake | 13.35 oz. |
| Cake displacement | 1,260 ml. |
| Cake appearance | Grain coarse and regular, nice peak, ring on top. |

PLASTIC SHORTENING CONTROL TEST

| | |
|---|---|
| Specific gravity of batter | 0.890 at 74° F. |
| Batter temperature | 75° F. |
| Batter appearance | Almost smooth. |
| Weight of cake | 13.50 oz. |
| Cake displacement | 1,185 ml. |
| Cake appearance | Slightly coarse and irregular grain, slight peak. |

In the above tests, the "ring on top" denotes slight over-emulsification and can be overcome without otherwise altering the merits of the cakes by reducing the amounts of Samples 4A and 4B to 1% by weight in combination with 4% of the lacto-palmitate emulsifier.

Comparable results in baking tests were secured when the stearic monoglyceride of Sample 4B was replaced with oleic monoglyceride.

In the preparation of the esters of diacetyl tartaric anhydride products the alcoholic component (stearyl alcohol or the designated monoglycerides) is reacted with the diacetyl tartaric anhydride at esterification temperatures of around 115° C. until a clear melt and an acid value indicating predominant formation of the half ester has been secured. In testing for the end point acid value, consideration should be given to the small amount of acid which is to be removed from the finished product when subjected to vacuum treatment to remove the odor of acetic acid. In routine preparations, however, this can be allowed for on the basis of previous experience, so that the reacting mass need not be deodorized before testing for attainment of the desired end-point acid value.

GENERAL UTILITY FACETS OF THE INVENTION

The foregoing description has related to the oil-soluble combinations of our emulsifier components. The following description relates to the same and analogous combinations of the components but involves variations thereof wherein the glyceride or other polyol ester component is not oil-soluble. Where such non-oil-soluble polyol esters are used, then of course the shortenings will not be clear solutions when liquid oils constitute the base stock of the shortening product. Such non-oil-soluble polyol esters can also be used equally well in plastic shortenings in combination with a cetyl citrate component or in combination with a mixture of cetyl citrate component and either or both of the tartaric derivatives described previously.

Turning first to the cetyl citrate component, all that has been said hereinabove in respect to oil-soluble combinations applies equally well where oil-solubility is not a factor being desired. In other words we again here prefer to use dicetyl citrate, but mixtures of dicetyl citrate and tricetyl citrate perform about as well, and are easier and less costly to prepare.

What has been said above about the tartaric derivatives also applies here equally well, so it need not be repeated here.

In reference to the polyol ester component, what has been said above in respect to the oil-soluble glyceride esters could be repeated here since such esters can of course be used advantageously in non-liquid shortenings, e.g., plastic shortening or fluid-type shortenings. (See Mitchell, U.S. Patent 2,521,242, as an illustration of the latter type of product.)

The present invention also contemplates the use of non-oil-soluble glyceride esters of the hydroxy acid types, such as are prepared by Little, U.S. Patent 2,480,232, or by Iveson-Radlove, U.S. Patent 2,690,971. Little describes mixed esters of lactic acid and saturated fatty acids containing 12 to 22 carbon atoms. Specific fatty acids contemplated are stearic, myristic and palmitic. Mixtures of such higher fatty acids are also useful for preparing the monoglycerides. The amounts of fatty acid can be that corresponding to the mono-fatty acid glyceride. Little prepares fully esterified glycerol esters and can use 1–2 mols of water-soluble hydroxy monocarboxylic acid per mol of glycerine in preparing them. Iveson and Radlove in U.S. Patent 2,690,971 prepare partial glyceride esters by using glycerine, fatty acids, and water soluble hydroxy monocarboxylic acids in the molar proportions of 1:1:½–1 respectively. As disclosed by Iveson et al. the fatty acids can be those of commercial acids such as commercial palmitic acid, stearic acid, or the commercial mixtures such as double and triple pressed stearic acid which are composed of 94 and 97% respectively of a mixture of the saturated acids, myristic, palmitic and stearic, the balance being oleic acid. The oil-soluble glyceride esters (as described fully hereinabove) use ratios of 1:1:1.75–3. Thus, under the concepts of the present invention the overall ratios which can be used for preparing the useful glyceride esters contemplated by the present invention are 1:1:½–3. These proportions apply to the starting materials. The starting materials can be combined by the various methods illustrated in Barsky (U.S. 2,509,414), Little (supra), or Iveson-Radlove (supra); namely, by first preparing mono-glycerides of the fatty acids followed by esterifying these partial esters with hydroxy acid (e.g., Example 4 of U.S. 2,690,971), or by means of a one-step method such as is disclosed in Example 1 of U.S. 2,690,971. The products so obtained should have an acid number below about 20 and are preferably washed sufficiently to remove substantially all of the water-soluble components thereof, but can, if desired, be used in an unwashed condition. As Little points out, however, the unwashed products are apt to have an undesirable flavor.

Where other tri-hydroxy or higher edible polyols are used (such as sorbitol) in place of glycerine, the same proportions of monohydroxy monocarboxylic acid and of fatty acids of 12–22 carbons stated above are employed per mol of such other polyol. When mixtures of say, glycerine and sorbitol are used as the polyol component, the same proportions are again used. Thus glycerine can always be regarded as the essential polyol of the system as far as computations of mol ratios are concerned.

The fatty acids which are used in preparing the glyceride or other polyol ester emulsifiers should preferably include at least 50% by weight of palmitic acid, as taught by Iveson et al., supra.

The hydroxy monocarboxylic acids employed can have up to 6 carbon atoms, and include lactic, hydroxyacetic, malic, hydroxybutyric, sarcolactic, hydracrylic and like acids.

The following examples illustrate the principles of these additional facets of the invention and include the best modes presently known to us for practicing those principles.

EXAMPLE 5

(A) *Preparation of oil-insoluble lactic palmitic glyceride emulsifier*

An emulsifier was prepared using the procedure of Example 1–A by incorporating the following materials:

1 mol of palmitic acid (Neo-Fat 16—a product of Armour & Company)
1 mol of glycerine
1.5 mols of 85% lactic acid The washed product so obtained was not soluble at a 4% level in cottonseed oil but was useful in the preparation of shortening composition where clarity was not required.

(B) *Preparation of cloudy shortening composition*

A shortening composition which bakes well in the household cake recipe but which is not clear at room temperature was prepared as follows: 4 grams of oil-insoluble emulsifier described above was mixed with 95.2 grams of cottonseed oil and 0.75 gram of the dicetyl citrate component of Example 1–B.

When this composition was incorporated into the cake formula of Example 2–A it gave a thin smooth batter having a specific gravity of 0.945 at 74° F. A 16 oz. batter baked at 360° F. for 22 minutes resulted in a layer cake weighing 13.65 oz. with a displacement of 1210 ml. On a volume/pound basis, a result of 1420 ml./pound was calculated.

EXAMPLE 6

Four grams of the mixture of emulsifiers used in Example 5–B were blended with 95.2 grams of an otherwise unemulsified plastic shortening, and the resulting shortening product was subjected to a baking test duplicating that of Example 5–B. Analogous results were secured.

EXAMPLE 7

The following illustrations of emulsifier-shortening combinations were used in baking tests, and the results thereof are summarized in the tabulation. A conventional white cake recipe was used.

Sample (1)—Control: The control was a commercial plastic shortening containing 4% of mono and diglycerides.

SORBITOL LACTO-PALMITATE PLUS DICETYL CITRATE

The sorbitol emulsifier used in Samples 2–5 was the reaction product of one mole each of sorbitol, lactic acid and palmitic acid. The dicetyl citrate used in Samples 2–5 had an acid value of 97.

Sample (2)—Liquid shortening (cloudy): One gram of dicetyl citrate, 4 g. of sorbitol lactopalmitate in 95 g. of cottonseed oil.

Sample (3)—Plastic shortening: Two and five tenths grams of sorbitol lacto-palmitate and 0.5 g. dicetyl citrate in 12 ml. of cottonseed oil were dispersed in 85 g. of commercial hydrogenated shortening.

Sample (4)—Glycerol lacto-palmitate plus dicetyl citrate (plastic shortening): Two and five tenths grams of glycerol lacto-palmitate (1:1:1 ratio) and 0.5 g. dicetyl citrate in 12 ml. of cottonseed oil were dispersed in 85 g. of commercial hydrogenated shortening.

Sample (5)—Sorbitol lacto-palmitate alone (liquid shortening (cloudy)): Five grams of sorbitol lacto-palmitate in 95 g. of cottonseed oil.

| Sample No. | Batter | | Cake [1] | | | |
|---|---|---|---|---|---|---|
| | Specific gravity at 78° F. | Emulsion | Weight in ounces [2] | Displacement (ml.) | Calc. vol./lb. | Comments |
| 1 | 0.850 | Almost smooth | 13.75 | 1,095 | 1,270 | Sli. coarse and regular, blistered top. |
| 2 | 0.88 | Thin and smooth | 13.45 | 1,140 | 1,360 | Coarser than 1, pitted top. Looks overemulsified. |
| 3 | 0.875 | Smooth | 13.60 | 1,160 | 1,370 | Sli. coarse and irregular, nice top. |
| 4 | 0.865 | Almost smooth | 13.70 | 1,105 | 1,300 | Sli. coarse and regular, sli. blistered top, no ring. |
| 5 | 0.870 | Smooth | 13.80 | 1,140 | 1,320 | Coarser than 1, sli. ring, good peak. |

[1] All cakes were baked at 360° F. for 22 minutes.
[2] From 16 ounces of batter.

From the foregoing description and examples it will be apparent that our hereindescribed combination of emulsifiers has general utility in the edible arts apart from such restricted uses as are involved in providing clear, liquid-oil, shortening products. In view thereof, the combinations of emulsifiers can be prepared and sold in commerce as distinct compositions of matter. Purchasers can then incorporate such compositions of matter in whatever shortening stock or other materials they may desire to employ, thereby to prepare emulsifiable shortening products, etc. Such compositions of matter, as will be understood, can be of two varieties; one, an oil-soluble composition, and the other, a non-oil-soluble composition. Either variety can be further subdivided into various types based on the type of acidic component employed. One type can be an all-cetyl-citrate type, another can be a mixed cetyl-citrate-tartaric derivative type. These, and further variations, can be employed to provide a mixture of emulsifier in proportions to give the desired functional qualities for particular end uses. If desired, then the emulsifiers either separately or in combination can be first dispersed in a carrier such as a glyceride oil or fat to facilitate handling and incorporation in the oil, shortening or other product in which it is to be used.

This application is a continuation in part of application Serial No. 623,784, filed November 23, 1956, now abandoned.

Having thus described our invention, we claim:

1. A composition of matter composed essentially of: liquid triglyceride oil and an emulsifier system which is completely soluble in said glyceride oil at about 25° C., said emulsifier system consisting of: (a) from about 3 to 5% by weight on said oil of a glyceride ester product prepared by simultaneously reacting together 1 mol of glycerine, 1 mol of at least one fatty acid selected from the group consisting of palmitic and stearic acids and 1.75 to 3 mols of lactic acid, and (b) .2–3% by weight on the oil of a cetyl citrate mixture in which dicetyl ester amounts to at least 50% by weight of the total in which monocetyl citrate amounts to less than 1% by weight of the total and in which the balance is essentially tricetyl citrate, said composition of matter having general-purpose shortening properties.

2. A composition as claimed in claim 1 wherein the fatty acid component of said glyceride ester product comprises at least 50% of palmitic acid.

3. A composition as claimed in claim 2 wherein the emulsifier system consists of about 4% by weight of said glyceride ester product and about 0.8–1.3% by weight of said cetyl citrate mixture.

4. A composition as claimed in claim 3 wherein said cetyl citrate mixture is composed essentially of dicetyl citrate.

5. A composition as claimed in claim 1 wherein said cetyl citrate mixture is composed essentially of dicetyl citrate.

6. A composition of matter consisting of: winterized cottonseed oil; about 4% by weight of the cottonseed oil of a lacto-palmitate glyceride derived by simultaneously reacting together 1 mol of glycerine, 1 mol of fatty acid comprising at least 90% palmitic acid, balance essentially stearic acid, and 2 mols of lactic acid; and about 1% by weight on the cottonseed oil of cetyl citrates in which the dicetyl ester is present in amounts of at least 50% by weight on the cetyl citrates, in which the monocetyl ester is present to at most 1% by weight on the cetyl citrates and in which the balance is essentially tricetyl citrate.

7. A composition as claimed in claim 6 wherein said cetyl citrate mixture is composed essentially of dicetyl citrate.

8. A composition of matter comprising:
(a) from about 3 to 5 parts by weight of an ester of glycerine containing for each mole of glycerine residue from 0.5 to 3 moles of lactic acid residues and one mole of fatty acid residue of C–12 to C–20 fatty acids at least one-half of which being palmitic acid residue, and
(b) from 0.2 to 5 parts by weight of an acidic emulsifier selected from the class consisting of (1) an acidic cetyl citrate composition containing not more than about 1% of monocetyl citrate, (2) an acidic stearyl lactyl tartrate in which at least one of the acid radicals of tartaric acid is esterified with stearyl alcohol and at least one of the hydroxy groups of the tartaric acid is esterified with lactic acid, said stearyl lactyl tartrate composition having an acid number of 25–35, (3) an acidic stearyl alcohol ester of diacetyl tartaric acid, (4) an acidic ester of a monoglyceride of a $C_{18}$ aliphatic hydrocarbon monocarboxylic acid having a molecular weight of at least 282 and diacetyl tartaric acid, and (5) mixtures of said acidic emulsifiers, said esters (3) and (4) having an acid number corresponding substantially to the acid number of the half-ester.

9. A composition of matter comprising:
(a) From about 3 to 5 parts by weight of an ester of an edible polyhydric alcohol containing at least three hydroxy groups containing for each mole of such polyhydric alcohol residue from 0.5 to 3 moles of lactic acid residues and one mole of fatty acid residue of C–12 to C–20 fatty acids at least one-half by weight of which are selected from the class consisting of palmitic and stearic acids, and
(b) From 0.2 to 5 parts by weight of an acidic emulsifier selected from the class consisting of (1) an acidic cetyl citrate composition containing not more than about 1% of monocetyl citrate, (2) an acidic stearyl lactyl tartrate in which at least one of the acid radicals of tartaric acid is esterified with stearyl alcohol and at least one of the hydroxy groups of the tartaric acid is esterified with lactic acid, said stearyl lactyl tartrate composition having an acid number of 25–35, (3) an acidic stearyl alcohol ester of diacetyl tartaric acid, (4) an acidic ester of a monoglyceride of a $C_{18}$ aliphatic hydrocarbon monocarboxylic acid having a molecular weight of at least 282 and diacetyl tartaric acid, and (5) mixtures of said acidic emulsifiers, said esters (3) and (4) having an acid number corresponding substantially to the acid number of the half-ester.

10. A composition of matter in accordance with claim 9 in which the (a) component is a glyceride ester.

11. A composition in accordance with claim 10 in which the (b) component is cetyl citrate.

12. A composition in accordance with claim 11 in which the cetyl citrate contains at least 50% dicetyl citrate.

13. A composition in accordance with claim 12 in which the (a) component contains from 1.75 to 3 moles of lactic acid.

14. A composition of matter comprising fatty acid triglyceride and from about 3 to 5% by weight of said triglyceride of an ester of glycerine containing for each mole of glycerine residue from 0.5 to 3 moles of lactic acid residues and one mole of fatty acid residue of C–12 to C–20 fatty acids at least one-half of which being palmitic acid residue, and from 0.2 to 5% by weight of the fatty acid triglyceride of an acidic emulsifier selected from the class consisting of (1) an acidic cetyl citrate composition containing not more than about 1% of monocetyl citrate, (2) an acidic stearyl lactyl tartrate in which at least one of the acid radicals of tartaric acid is esterified with stearyl alcohol and at least one of the hydroxy groups of the tartaric acid is esterified with lactic acid, said stearyl lactyl tartrate composition having an acid member of 25–35, (3) an acidic stearyl alcohol ester of diacetyl tartaric acid, (4) an acidic ester of a monoglyceride of a $C_{18}$ aliphatic hydrocarbon monocarboxylic acid having a molecular weight of at least 282 and diacetyl tartaric acid, and (5) mixtures of said acidic emulsifiers, said esters (3) and (4) having an acid number corresponding substantially to the acid number of the half-ester.

15. A composition of matter comprising fatty acid triglyceride and from about 3 to 5% by weight of said triglyceride of an ester of an edible polyhydric alcohol containing at least three hydroxy groups for each mole of such polyhydric alcohol residue from 0.5 to 3 moles of lactic acid and one mole of fatty acid residue of C–12 to C–20 fatty acids at least one-half by weight of which are selected from the class consisting of palmitic and stearic acids and from 0.2 to 5% by weight of the fatty acid triglyceride of an acidic emulsifier selected from the class consisting of (1) an acidic cetyl citrate composition containing not more than about 1% of monocetyl citrate, (2) an acidic stearyl lactyl tartrate in which at least one of the acid radicals of tartaric acid is esterified with stearyl alcohol and at least one of the hydroxy groups of the tartaric acid is esterified with lactic acid, said stearyl lactyl tartrate composition having an acid member of 25–35, (3) an acidic stearyl alcohol ester of diacetyl tartaric acid, (4) an acidic ester of a monoglyceride of a $C_{18}$ aliphatic hydrocarbon monocarboxylic acid having a molecular weight of at least 282 and diacetyl tartaric acid, and (5) mixtures of said acidic emulsifiers, said esters (3) and (4) having an acid number corresponding substantially to the acid number of the half-ester.

16. A composition in accordance with claim 15 in which the polyhydric alcohol is glycerine.

17. A composition of matter in accordance with claim 16 in which the acidic emulsifier is a cetyl citrate.

18. A composition of matter in accordance with claim 17 in which the cetyl citrate is at least 50% dicetyl citrate.

19. A composition of matter in accordance with claim 16 in which the fatty acid triglyceride is liquid and the lactic acid containing ester contains the residues of one mole of glycerine, one mole of fatty acid and from 1.75 to 3 moles of lactic acid.

References Cited in the file of this patent

UNITED STATES PATENTS

| 2,480,332 | Little | Aug. 30, 1949 |
|---|---|---|
| 2,485,634 | Vahlteich et al. | Oct. 25, 1949 |
| 2,485,638 | Gooding et al. | Oct. 25, 1949 |
| 2,509,414 | Barsky | May 30, 1950 |
| 2,689,797 | Joffee | Sept. 21, 1954 |
| 2,690,971 | Iveson et al. | Oct. 5, 1954 |
| 2,746,868 | Cross et al. | May 22, 1956 |
| 2,864,703 | Schulman | Dec. 16, 1958 |
| 2,864,705 | Schulman | Dec. 16, 1958 |

FOREIGN PATENTS

| 756,549 | Great Britain | Oct. 15, 1952 |
|---|---|---|
| 684,620 | Great Britain | Dec. 24, 1952 |